3,072,683
1 - AMINO - 4 - SULFONAMIDOANTHRAQUINONE COMPOUNDS CONTAINING AN ETHER GROUP IN THE 2-POSITION
James M. Straley and Ralph R. Giles, Kingsport, Tenn., assignors to Eastman Kodak Company, Rochester, N.Y., a corporation of New Jersey
No Drawing. Filed Jan. 30, 1961, Ser. No. 85,506
7 Claims. (Cl. 260—347.2)

This invention relates to new anthraquinone compounds and their application to the art of dyeing or coloring.

The dyeing of polyester textile materials, such as polyethylene terephthalate, has presented difficulties. While it is known that the familiar disperse dyes, that is, water-insoluble dyes, employed for the coloration of cellulose acetate frequently possess affinity for polyester textile materials such as polyethylene terephthalate, by far the majority of the known disperse dyes for cellulose acetate exhibit poor fastness to light when applied to polyester textile materials. The new water-insoluble anthraquinone compounds of our invention possess good affinity for polyester textile materials and give red dyeings thereon having good fastness properties, including good fastness to light. Additionally, they have good affinity for cellulose acetate, for example, and yield dyeings of high quality thereon.

Polyester fabrics are usually heat set, after dyeing, at temperatures which often reach 375° F. to 400° F. If the dye is not fast to sublimation it will be removed in part, at least, from the goods during this operation. Some dyes, otherwise suitable for dyeing polyester fabrics, are unsuitable because they are not fast to sublimation. The new anthraquinone compounds of our invention yield dyeings on the textile materials indicated herein which have excellent fastness to sublimation.

It is an object of our invention to provide new anthraquinone compounds. Another object is to provide a satisfactory process for the preparation of our new anthraquinone compounds. A further object is to provide dyed polyester textile materials which have good fastness properties. Another object is to provide dyed cellulose alkyl carboxylic acid ester textile materials which have good fastness properties. A particular object is to provide dyed polyethylene terephthalate textile materials which have good fastness properties. A further particular object is to provide dyed cellulose acetate textile materials which have good fastness properties.

We have discovered that the anthraquinone compounds having the formula:

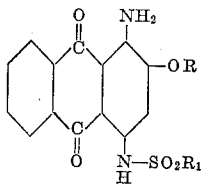

wherein R represents a member selected from the group consisting of an alkyl group, having 1 to 8 carbon atoms, an alkoxyalkyl group, having 3 to 6 carbon atoms, a hydroxyalkyl group, having 2 to 4 carbon atoms, the allyl group, the benzyl group, the cyclohexyl group, the tetrahydrofurfuryl group and the β-phenoxyethyl group and $R_1$ represents a member selected from the group consisting of an alkyl group, having 1 to 8 carbon atoms, an alkoxyalkyl group, having 3 to 6 carbon atoms, and the cyclohexyl group are valuable dyes for coloring polyester and cellulose alkyl carboxylic acid ester, having 2 to 4 carbon atoms in the acid groups thereof, textile materials. These dye compounds when applied to the aforesaid textile materials have good affinity therefor and give red dyeings of high quality. In general, the dyeings obtained have good to excellent fastness to light, gas, washing and sublimation.

Methyl, ethyl, n-propyl, isopropyl, n-butyl, isobutyl, secondary butyl, n-amyl, isoamyl, n-hexyl, isohexyl, n-heptyl and n-octyl are illustrative of the alkyl groups represented by R and $R_1$. β-Methoxyethyl, β-ethoxyethyl, β-n-propoxyethyl and β-n-butoxyethyl are illustrative of the alkoxyalkyl groups represented by R and $R_1$. β-Hydroxyethyl, β-hydroxypropyl, γ-hydroxypropyl, β,γ-dihydroxypropyl and δ-hydroxybutyl are illustrative of the hydroxyalkyl groups represented by R.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and celluose acetate-butyrate.

The polyester textile materials that can be dyed with the new anthraquinone compounds of our invention include polyethylene terephthalate textile materials obtained for example as described in U.S. Patent 2,465,319, patented March 22, 1949, or other polyester textile materials formed from analogous fiber-forming linear polyesters, such as polyesters derived from p,p'-diphenylsulfonedicarboxylic acid and various aliphatic acids and glycols as described in U.S. Patent 2,744,088 patented May 1, 1956, and polyesters derived from various acids, such as terephthalic acid and 1,4-cyclohexanedimethanol (1,4-dimethylolcyclohexane) as described in Kibler, Bell and Smith U.S. Patent 2,901,466.

The polyethylene terephthalate fibers sold on the market under the E. I. du Pont de Nemours and Company trademark "Dacron" and the polyester fibers sold on the market under the Eastman Kodak Company trademark "Kodel" are illustrative of the polyester textile materials that can be dyed with the new anthraquinone compounds of our invention. These fibers are more particularly described in U.S. Patents 2,465,319 and 2,901,466, respectively. The polyester textile materials specifically referred to hereinbefore are linear polyesters having a melting point of at least 200° C. Polyesters having a lower melting point than 200° C. can also be dyed or colored with the new anthraquinone compounds of our invention.

The new anthraquinone compounds of our invention can be prepared in several ways:

(a) 1-amino-2,4-dibromoanthraquinone is reacted with a sulfonamide compound having the formula $R_1SO_2NH_2$ to replace the bromine atom in the 4-position with a

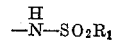

group, following which the bromine atom in the 2-position is replaced by a —OR group by treatment with a solution of metallic sodium in an alcohol having the formula ROH.

(b) 1-amino - 4 - bromoanthraquinone - 2 - sulfonic acid (bromamine acid) or its alkali metal salts is reacted with a sulfonamide compound having the formula $R_1SO_2NH_2$ to replace the bromine atom with a

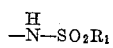

group, following which the sulfonic acid group in the 2-position is replaced by a —OR group by treatment with an alcohol having the formula ROH in the presence of KOH.

(c) Compounds of our invention wherein —OR represents an alkoxy group can be prepared by reacting a 1,4-diamino-2-alkoxyanthraquinone with a sulfonyl halide having the formula $R_1SO_2X$.

R and $R_1$ have the meaning previously assigned to them while X represents a chlorine or bromine atom. We prefer method b.

Polyester textile materials can be dyed with the anthraquinone compounds of the invention by known methods for dyeing polyester textile materials. The methods disclosed in U.S. Patents 2,757,064 and 2,880,050, for example, can be used. Cellulose alkyl carboxylic acid esters having 2 to 4 carbon atoms in the acid groups thereof textile materials likewise can be dyed with the anthraquinone compounds of the invention by known methods for dyeing such materials.

The following examples illustrate the anthraquinone compounds of the invention and their preparation.

EXAMPLE 1

4.04 grams of 1-amino-4-bromoanthraquinone-2-sodium sulfonate, 1.25 grams of ethanesulfonamide, 1.84 grams of sodium acetate, 0.1 gram of copper sulfate crystals and 150 cc. of water were refluxed together until 1 cc. of the solution added to 10 cc. of 10% aqueous sodium hydroxide gave a clear violet solution. This required about 2.5 hours. The reaction mixture thus obtained was cooled, made acid with sulfuric acid and the reaction product formed was salted out with sodium chloride. The reaction product was recovered by filtration, washed free of acid with a cold 5% aqueous sodium chloride solution and dried. 3.78 grams of 1-amino-4-ethylsulfonamidoanthraquinone-2-sulfonic acid were obtained as a red solid.

3.25 grams of the 1-amino-4-ethylsulfonamidoanthraquinone-2-sulfonic acid formed above were added to a melt of 15 grams of potassium hydroxide and 30 cc. of methyl alcohol at 80° C. and stirred for one hour at 80° C. The original blue solution changed to violet. 30 cc. of water were added dropwise to the reaction mixture while removing the excess methyl alcohol by distillation. The reaction mixture was allowed to cool and was then filtered. The precipitate obtained was washed by slurrying in hot water. The reaction product, 1-amino-2-methoxy-4-ethylsulfonamidoanthraquinone, dyes polyester textile materials, such as Dacron and Kodel polyester fibers, deep bright red shades. A carrier, such as Dacronyx, is used in the polyester dyeing operation.

EXAMPLE 2

5.15 grams of 1-amino-4-bromoanthraquinone-2-sodium sulfonate, 0.1 gram of crystalline copper sulfate, 1.66 grams of potassium carbonate, 1.84 grams of $\beta$-ethoxyethanesulfonamide and 150 cc. of water were refluxed together for 5.5 hours at which time tests indicated the absence of bromamine acid. 25 grams of potassium chloride were added to the reaction mixture, following which the reaction mixture was cooled to 10° C. while stirring. The reaction product which precipitated was recovered by filtration, washed with a cold 10% aqueous potassium chloride solution and dried at 110° C.

2 grams of the reaction product obtained as described above were added to a melt of 10 grams of potassium hydroxide and 20 cc. of methyl alcohol at 80° C. and stirred for one hour at 80° C. 30 cc. of water were added dropwise while removing the excess methyl alcohol by distillation. The reaction mixture was then allowed to cool and was then filtered. The precipitate was washed by slurrying in hot water. 1-amino-2-methoxy-4-$\beta$-ethoxyethylsulfonamidoanthraquinone was thus obtained. It dyes polyester textile materials, such as Dacron and Kodel polyester fibers, bright red shades.

EXAMPLE 3

5.15 grams of 1-amino-4-bromoanthraquinone-2-sodium sulfonate, 0.1 gram of crystalline copper sulfate, 1.66 grams of potassium carbonate, 1.81 grams of n-pentanesulfonamide and 150 cc. of water were refluxed together for 5 hours, at which time 50 cc. of water were added to maintain complete solution. Refluxing was continued until tests indicated the absence of bromamine acid. The reaction mixture was then cooled to about 10° C. and then filtered. The reaction product collected on the filter was washed well with a cold aqueous 5% potassium chloride solution and dried at 110° C.

2 grams of the reaction product obtained as described hereinbefore were added to a melt of 10 grams of potassium hydroxide and 20 cc. of methyl alcohol at 80° C. After 30 minutes at this temperature the reaction mixture was drowned in 1000 cc. of water. The reaction product, 1-amino-2-methoxy-4-n-pentylsulfonamidoanthraquinone, which precipitated was recovered by filtration, washed well with water and dried in a vacuum at 60° C. It dyes polyester textile materials, such as Dacron and Kodel polyester fibers, beautiful deep red shades.

EXAMPLE 4

Example 3 was repeated using 1.76 grams of n-butanesulfonamide instead of n-pentanesulfonamide. The dye compound obtained, 1-amino-2-methoxy-4-n-butylsulfonamidoanthraquinone, dyes polyester textile materials, such as Dacron and Kodel polyester fibers, deep red shades.

EXAMPLE 5

51.5 grams of 1-amino-4-bromoanthraquinone-2-sulfonic acid, 16.6 grams of potassium carbonate, 11.4 grams of methanesulfonamide, 0.5 gram of $CuSO_4 \cdot 5H_2O$ and 1500 cc. of water were refluxed together for 6 hours. 150 grams of sodium chloride and 80 grams of potassium chloride were added and then the reaction mixture was cooled to 10° C. and filtered. The slightly sticky precipitate recovered on the filter was dissolved by warming in 750 cc. of water. 5 grams of activated charcoal were added to the reaction mixture which was brought to the boil and then filtered. 75 grams of potassium chloride were added to the hot filtrate, which was cooled to about 10° C. and then filtered. The potassium salt of 1-amino-4-methylsulfonamidoanthraquinone-2-sulfonate was recovered on the filter, washed with water and dried at 100° C.

EXAMPLE 6

Two grams of the product of Example 5 were added to a melt of 10 grams of potassium hydroxide and 30 cc. of n-butyl alcohol at 80° C. and held for 45 minutes at this temperature. The reaction mixture thus obtained was poured into water and the n-butyl alcohol was removed by steam distillation. The reaction product, 1-amino-2-n-butoxy-4-methylsulfonamidoanthraquinone, which precipitated, was recovered by filtration, washed well with water and dried. It dyes polyester textile materials, such as Dacron and Kodel polyester fibers, red shades.

EXAMPLE 7

Two grams of the product of Example 5 were added to a melt of 10 grams of potassium hydroxide and 30 cc. of tetrahydrofurfuryl alcohol at 80° C. and held for 45 minutes at this temperature. The reaction mixture thus obtained was diluted to 10 times its volume with water and the alkali present was neutralized with acetic acid. The tetrahydrofurfuryl alcohol present was then removed by steam distillation. After cooling to about 10° C. the reaction mixture was filtered to recover the precipitated reaction product which was washed well with water and dried. 1-amino-2-tetrahydrofurfuryloxy-4-methylsulfonamidoanthraquinone was thus obtained. It dyes polyester textile materials, such as Dacron and Kodel polyester fibers, red shades.

EXAMPLE 8

Example 6 was repeated using 20 cc. of absolute ethyl alcohol in place of n-butyl alcohol. 1-amino-2-ethoxy-4-methylsulfonamidoanthraquinone was obtained. It dyes polyester textile materials, such as Dacron and Kodel polyester fibers, red shades.

EXAMPLE 9

Three grams of 1,4-diamino-2-methoxyanthraquinone, 18 cc. of ethylene glycol monomethyl ether and 2 grams of cyclohexane-sulfonylchloride were refluxed together until evolution of HCl ceased. The hot reaction mixture resulting was diluted with methyl alcohol to incipient crystallization, cooled and filtered. 1-amino-2-methoxy-4-cyclohexylsulfonamide was collected on the filter as a solid and was washed with cold methyl alcohol and then air dried. It dyes polyester textile materials, such as Dacron and Kodel polyester fibers, red shades.

EXAMPLE 10

Example 3 was repeated using 1.81 grams of 3-methyl-butanesulfonamide in place of n-pentanesulfonamide. 1-amino-2-methoxy - 4 - isoamylsulfonamidoanthraquinone was obtained. It dyes polyester textile materials, such as Dacron and Kodel polyester fibers, red shades.

EXAMPLE 11

Example 6 was repeated using 30 cc. of cyclohexanol in place of n-butyl alcohol. 1-amino-2-cyclohexoxy-4-methylsulfonamidoanthraquinone was obtained. It dyes polyester textile materials, such as Dacron and Kodel polyester fibers, red shades.

EXAMPLE 12

Example 6 was repeated using 30 cc. of benzyl alcohol in place of n-butyl alcohol. The product was recovered by drowning in methyl alcohol and filtering. 1-amino-2-benzyloxy-4-methylsulfonamidoanthraquinone was obtained. It dyes polyester textile materials, such as Dacron and Kodel polyester fibers, bright red shades, slightly bluer than obtained with the dye compounds of the preceding examples.

EXAMPLE 13

Example 6 was repeated using 30 cc. of β-ethoxyethyl alcohol in place of n-butyl alcohol. 1-amino-2-β-ethoxyethoxy-4-methylsulfonamidoanthraquinone was obtained. It dyes polyester textile materials, such as Dacron and Kodel polyester fibers, red shades.

EXAMPLE 14

1.5 grams of the product of Example 5, 15 cc. of phenyl Cellosolve ($C_6H_5OCH_2CH_2OH$) and 6 grams of potassium hydroxide were heated and stirred together for 2 hours at 80° C. The reaction mixture resulting was drowned in 200 cc. of water containing 5 grams of acetic acid. After chilling to 10° C. the precipitated reaction product was recovered by filtration and then redissolved in 20 cc. of ethylene glycol monoethyl ether. Methyl alcohol was added to incipient crystallization and then the mixture was cooled to 10° C. and the precipitated dye compound was recovered by filtration and washed with cold methyl alcohol. 1-amino-2-β-phenoxyethoxy-4-methylsulfonamidoanthraquinone was obtained. It dyes polyester textile materials, such as Dacron and Kodel polyester fibers, bright red shades.

EXAMPLE 15

Example 7 was repeated using 20 cc. of β-(n-butoxy)-ethanol in place of tetrahydrofurfuryl alcohol. 1-amino-2 - β - (n - butoxy)ethoxy - 4 - methylsulfonamidoanthraquinone was obtained. It dyes polyester textile materials, such as Dacron and Kodel polyester fibers, bright red shades.

EXAMPLE 16

*Preparation of β-Ethoxyethanesulfonamide*

168.3 grams of 2-bromoethyl ethyl ether in 1250 cc. of 95% ethyl alcohol and 450 cc. of water were heated to reflux. A solution of 126 grams of $Na_2SO_3$ in 450 cc. of water was added over a period of 1.5 hours. The reaction mixture was evaporated to dryness and the residue obtained was extracted twice with boiling ethyl alcohol and then dried at 65° C. 81 grams of the material thus obtained were treated with 108 grams of $PCl_5$, an exothermic reaction taking place. The reaction mixture was then heated for 3 hours on a steam bath, cooled and 500 cc. of ice and water were added. The oil which separated was distilled, boiling at 68 to 77° C./0.7–1.4 mm. 55 grams of the β-ethoxyethane sulfonyl chloride

$$(C_2H_5OC_2H_4SO_2Cl)$$

thus obtained were dissolved in 400 cc. of benzene, cooled to 10° C. and anhydrous $NH_3$ was bubbled through it for 2 hours. The $NH_4Cl$ formed as a by-product was removed by filtration and then the benzene was removed by evaporation. β-Ethoxyethanesulfonamide

$$(CH_3CH_2OCH_2CH_2SO_2NH_2)$$

was thus obtained as a rather oily product. It was used without further treatment.

All, or nearly all, the other sulfonamide compounds that can be used in preparing the anthraquinone compounds of our invention are known compounds. Any not specifically described can be prepared in accordance with the methods used to prepare the known sulfonamide compounds. Further, the method just described can be adapted to prepare sulfonamide compounds other than the one specifically described.

Following the procedures described hereinbefore, the anthraquinone dye compounds of our invention indicated hereinafter are readily prepared.

| R | R¹ |
|---|---|
| methyl | methyl |
| n-propyl | methyl |
| isopropyl | methyl |
| n-amyl | methyl |
| n-hexyl | methyl |
| n-heptyl | methyl |
| n-octyl | methyl |
| methyl | β-methoxyethyl |
| methyl | β-(n-butoxy)ethyl |
| methyl | n-octyl |
| ethyl | ethyl |
| n-butyl | cyclohexyl |
| n-butyl | n-butyl |
| β-methoxyethyl | methyl |
| β-methoxyethyl | n-butyl |
| allyl | methyl |
| allyl | n-butyl |
| allyl | n-octyl |
| allyl | cyclohexyl |
| allyl | β-ethoxyethyl |
| β-hydroxyethyl | methyl |
| β-hydroxyethyl | cyclohexyl |
| β-hydroxypropyl | methyl |
| γ-hydroxypropyl | methyl |
| β,γ-dihydroxypropyl | methyl |
| δ-hydroxybutyl | methyl |

As noted hereinbefore, the new anthraquinone compounds of our invention dye polyester and cellulose alkyl carboxylic acid ester textile materials red shades having good to excellent fastness to light, gas, washing and sublimation. All the anthraquinone compounds set forth in the preceding tabulation yield red dyeings on the aforesaid textiles which have the fastness properties just noted. This also applies to the dye compounds of the examples.

The new anthraquinone compounds of our invention can be used to color the polyester and the cellulose alkyl carboxylic acid ester textile materials mentioned hereinbefore by methods well known to those skilled in the art to which this invention is directed. They may be directly applied to the material undergoing coloration in the form of an aqueous suspension which can be prepared by grinding them to a paste in the presence of a sulfonated oil, soap, sodium lignin sulfonate, or other suitable dispersing agent and dispersing the resulting paste in water.

In the case of cellulose alkyl carboxylic acid ester textile materials direct dyeing operations can, with advantage, be conducted at temperatures of about 70°–90° C., but any suitable temperature can be used. Thus, the textile material such as cellulose acetate, for example, to be dyed or colored is ordinarily added to the dye bath at a temperature lower than that at which the main portion of the dyeing is to be effected, a temperature approximating 45° C.–55° C., for example, following which the temperature is raised to that selected for carrying out the dyeing operation.

While the temperatures given in the dyeing procedure just set forth apply primarily to cellulose alkyl carboxylic acid ester textile materials, with the modifications indicated hereinafter, this dyeing procedure also applies to the dyeing of polyester textile materials. As understood by those skilled in the dyeing art somewhat higher temperatures than those set forth in the preceding paragraph are ordinarily employed when polyester textile materials are being dyed. These latter materials are ordinarily dyed at the boil and usually an assistant, commonly known as a "carrier" is employed. The "carriers" have various active ingredients, such as chlorinated benzenes and o-phenylphenol, for example, in emulsion. Dacronyx is the trade name of an illustrative suitable "carrier."

As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

The following example illustrates one satisfactory way in which polyester textile materials can be dyed with the new anthraquinone compounds of our invention.

EXAMPLE 17

0.3 gram of a 33.3% dispersion of 1-amino-2-methoxy-4-isoamylsulfonamidoanthraquinone were added to 50 cc. of cold water and stirred until completely wet out. One cc. of a 2% Igepon T solution was added and the dyebath was brought to a volume of 300 cc. with water. Three cc. of Dacronyx (a chlorinated benzene emulsion) were added and 10 grams of a textile fabric made of Kodel polyester fibers were entered. The fabric was worked 10 minutes without heat and then for 10 minutes at 80° C. The dyebath was then brought to the boil and held at the boil for one hour. Following this the fabric was rinsed in warm water, then scoured in an aqueous 0.2% soap, 0.2% sodium carbonate solution at 80 C. After scouring the fabric was rinsed with water and dried. The fabric was dyed a beautiful red shade having excellent fastness to light, gas, washing and sublimation.

A similar result is obtained when the fabric is made of Dacron polyester fibers.

Other carriers, such as methyl salicylate, methyl terephthalate and o-phenylphenol, for example, can be used instead of the Dacronyx employed in Example 16.

The invention has been described in detail with particular reference to preferred embodiments thereof, but it will be understood that variations and modifications can be effected within the spirit and scope of the invention as described hereinabove and as defined in the appended claims.

We claim:
1. An anthraquinone compound having the formula:

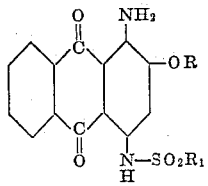

wherein R represents a member selected from the group consisting of an unsubstituted alkyl group having 1 to 8 carbon atoms, an unsubstituted alkoxyalkyl group having 3 to 6 carbon atoms, an unsubstituted hydroxyalkyl group having 2 to 4 carbon atoms, the allyl group, the benzyl group, the cyclohexyl group, the tetrahydrofurfuryl group and the β-phenoxyethyl group and $R_1$ represents a member selected from the group consisting of an alkyl group having 1 to 8 carbon atoms, an alkoxyalkyl group having 3 to 6 carbon atoms and the cyclohexyl group.

2. An anthraquinone compound having the formula:

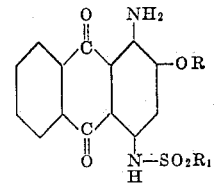

wherein R and $R_1$ each represents an unsubstituted alkyl group having 1 to 8 carbon atoms.

3. The anthraquinone compound having the formula:

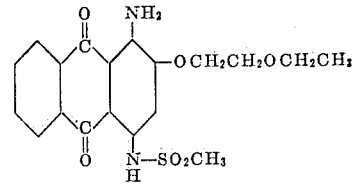

4. The anthraquinone compound having the formula:

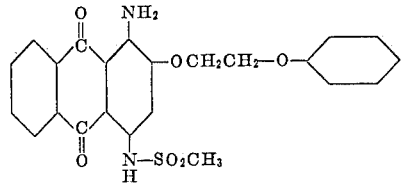

5. The anthraquinone compound having the formula:

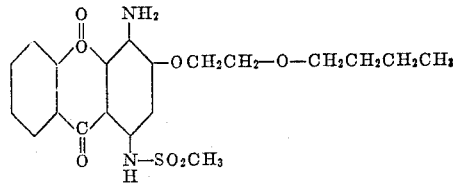

6. The anthraquinone compound having the formula:

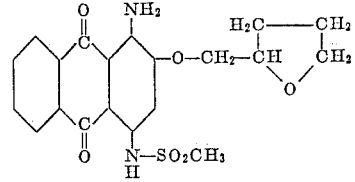

7. The anthraquinone compound having the formula:

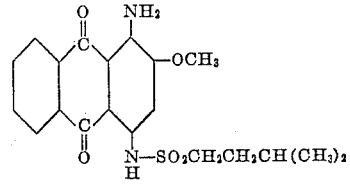

References Cited in the file of this patent
UNITED STATES PATENTS 1,881,752    Lodge et al. _____ Oct. 11, 1932
2,188,369    McNally et al. _____ Jan. 20, 1940